United States Patent Office 2,874,910
Patented Feb. 24, 1959

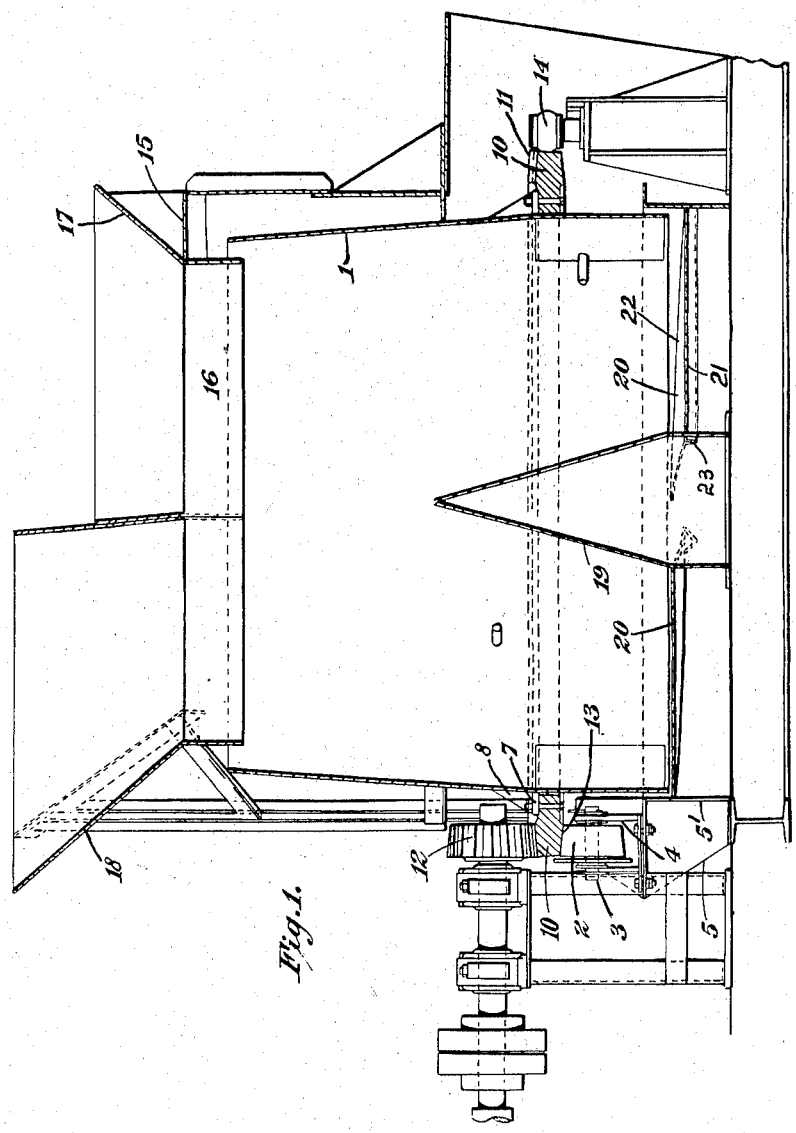

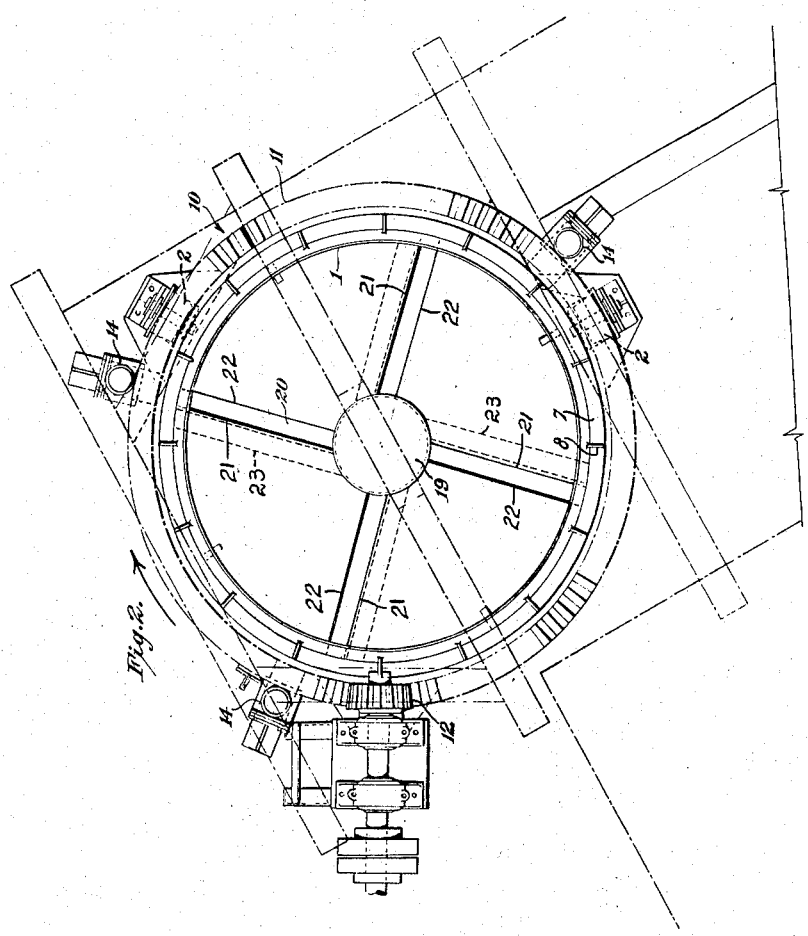

2,874,910

CUTTING AND HANDLING MACHINE FOR CEMENT SLURRY CAKE, PUG AND LIKE MATERIALS

Lewis Henry Bishop, Shoreham by Sea, England, assignor to The Associated Portland Cement Manufacturers Limited, London, England, a company of Great Britain Application August 20, 1956, Serial No. 604,941

Claims priority, application Great Britain August 29, 1955

1 Claim. (Cl. 241—95)

This invention comprises a machine for handling and cutting up a pug or similar mass of material which is of clay-like consistency.

In certain industries, as in the manufacture of Portland cement with reference to which the invention is hereinafter illustrated in detail, finely divided raw material, if necessary having first been finely ground, proportioned and blended, is added to water to make a slurry.

In the next stage of the process, the slurry is concentrated, such as by filtration to form a solid mass of cake-like or clayey consistency, similar to what in other industries is referred to as "the pug."

When in this condition the slurry cake or pug is extremely tenacious and difficult to handle and as in many processes it is required in handable or controlled quantities at a measured rate, it becomes necessary to break the cake or pug down into comparatively small size lumps.

This invention has for its object a machine by which a pug or cake mass of material having a clay-like consistency can be cut up for subsequent handling and processing.

According to the present invention a machine for handling masses such as cement cake, pug of a tenacious and clay-like consistency comprises a drum mounted to revolve about a vertical axis, a number of stationary cutter blades of improved construction and arrangement at the bottom of the drum by means of which the material is cut up as the drum revolves and means for imparting rotary movement to the drum.

The drum which is preferably cylindrical and tapered from bottom to top, may be provided with an exterior circumferential flange to which a toothed driving ring is secured, the driving ring conveniently serving also as a means of rotatably supporting the drum. For this purpose the underside of the ring has a machined surface for engagement with support rollers.

The invention is illustrated in the accompanying drawings in which:

Figure 1 is a vertical section, and

Figure 2 a part plan view of a cutting and feeding machine suitable for cutting up cement slurry cake.

Referring to the drawings the cutting and feeding machine of this invention essentially comprises a vertically arranged revolving drum, indicated generally at 1, cooperating with a number of fixed cutter blades 20 in the base. The drum 1, which preferably is cylindrical, is tapered from the bottom to the top, and is open at both ends.

The drum 1 is mounted to rotate on a series of support rollers 2, the rollers 2, of which there may be three or more depending on the size of the drum freely revolving on horizontal spindles 3 carried in brackets 4 fast on an annular base structure 5.

Secured to the drum 1 is a flange ring 7, 8 being reinforcement webs and to which flange is bolted a driving ring 10 having on its upper face driving teeth 11, in mesh with which is a bevel pinion 12.

The driving ring 10 serves a double purpose and its underside is machined to form a roller path 13, which preferably as shown is bevelled to cooperate with a corresponding bevel on the support rollers 2 in order to give a self-centering action.

As an additional safeguard side thrust rollers 14 may be fitted.

Partly encircling the open upper end of the drum is an annular housing 15 which supports a hopper 16 having a conical mouth 17, which may be fitted on the feed side with an extension lip 18.

The base structure 5 includes a circular confining wall 5' which overlaps the lower end of the drum 1 and arranged centrally within it is a cone-piece 19. Disposed regularly around the cross-section of the drum and extending between the cone-piece 19 and the outer wall 5' are four stationary cutter blades 20 of quadrant shape forming parts of helical surfaces of the same angle, the cutting edges of which may be tipped with e. g. "Hardex" or may be provided with strips which are detachably secured thereto for the purpose of renewal. As shown in Figure 2, adjacent blades 20 are spaced from one another with the trailing edge 21 of each blade approximately 3½" forward of the cutting edge of the following blade. As shown in Figure 1, the inner end of each cutting edge 22, that is the end adjacent to the center of the drum, is approximately 2" above the inner end of the trailing edge 21 of the next preceding blade 20. Each cutting edge 22 is inclined outwardly and downwardly to approximately the level of the trailing edges 21. To ensure that the mass of material will rotate with the drum pegs or equivalent means may be fitted to the inside of the drum.

The drive to the drum 1 by which it is caused to revolve in the clockwise direction may be by means of an electric motor (not shown) on an adjustable sole plate coupled through a variable belt drive to a worm reduction gear box. The output shaft of the gear box is coupled by a flexible coupling to the shaft carrying the bevel pinion 12.

The present machine is specifically intended for use in handling cement slurry cake as produced by the type of movable plate press which is the subject of the co-pending application of Lewis Henry Bishop Serial No. 598,051, filed July 16, 1956. In operation the feeder drum is filled to capacity with "Cake," and slowly rotated. The weight of the mass of cake is such that it gravitates towards the bottom of the feeder drum, and while still rotating comes in contact with the fixed blades 20 in the cutter base. The fixed blades "peel" off slices of cake of predetermined thickness and these fall, via a chute, to the band conveyor beneath. The rate of rotation of the drum may be varied to give the required rate of feed. The conveyor band delivers the cut up cake to a pug mill where it is further broken down prior to passage through a revolving drum to be made into nodules such as by plant described in our application Serial No. 592,145.

What is claimed is:

A machine for cutting slurry cake, pug, and like material and adapted to supply the cut material in controlled and continuous operation, said machine comprising a drum having an opening at the top and an opening at the bottom, means mounting said drum for revolution thereof about a vertical axis, a plurality of stationary quadrant shaped cutting blades spaced around the cross-section of said bottom opening with the trailing edge of each blade spaced forwardly of the cutting edge of the following blade, said quadrant shaped blades closing said bottom opening except for the spaces between adjacent leading and trailing edges of adjacent blades, said blades forming parts of helical surfaces on the same angle and being upwardly inclined from their trailing edges toward their cutting edges with the trailing edge of each blade lying below and in front of the cutting edge of the following blade, the inner end of each cutting edge being spaced above the trailing edge of the next preceding blade and each cutting edge being inclined outwardly and downwardly to approximately the level of the trailing edges, said inclinations being such that material fed into said drum through said upper opening is presented to said cutting edges as said drum is caused to revolve in one direction and is thereby automatically cut up and discharged from the drum between said blades.

References Cited in the file of this patent

UNITED STATES PATENTS

| | | |
|---|---|---|
| 324,664 | Cummings | Aug. 18, 1885 |
| 495,235 | Vaughn | Apr. 11, 1893 |
| 509,564 | Zehe | Nov. 28, 1893 |
| 567,854 | Gibson | Sept. 15, 1896 |
| 706,073 | Lippincott | Aug. 5, 1902 |
| 1,016,644 | Peckelsen | Feb. 6, 1912 |
| 1,207,069 | Park | Dec. 5, 1916 |
| 1,732,521 | Lorenz | Oct. 22, 1929 |
| 1,970,997 | Dorman | Aug. 21, 1934 |
| 2,554,888 | Wood | May 29, 1951 |
| 2,710,423 | Douglas | June 14, 1955 |

FOREIGN PATENTS

| | | |
|---|---|---|
| 15,804 | Denmark | Mar. 21, 1912 |
| 162,063 | Australia | Mar. 18, 1955 |
| 944,281 | Germany | June 14, 1956 |